United States Patent
Kang

(10) Patent No.: US 11,835,447 B1
(45) Date of Patent: Dec. 5, 2023

(54) METHOD FOR MEASURING CHARACTERISTIC OF THIN FILM

(71) Applicant: AUROS TECHNOLOGY, INC., Hwaseong-si (KR)

(72) Inventor: Tae Dong Kang, Suwon-si (KR)

(73) Assignee: AUROS TECHNOLOGY, INC., Hwaseong-si (KR)

( * ) Notice: Subject to any disclaimer, the term of this patent is extended or adjusted under 35 U.S.C. 154(b) by 0 days.

(21) Appl. No.: 18/366,835

(22) Filed: Aug. 8, 2023

Related U.S. Application Data

(63) Continuation of application No. PCT/KR2022/013446, filed on Sep. 7, 2022.

(30) Foreign Application Priority Data

Jan. 25, 2022 (KR) .......................... 10-2022-0010537

(51) Int. Cl.
*G01B 11/28* (2006.01)
*G01N 21/21* (2006.01)

(52) U.S. Cl.
CPC ..... *G01N 21/211* (2013.01); *G01N 2021/213* (2013.01); *G01N 2201/126* (2013.01)

(58) Field of Classification Search
CPC ............. G01N 21/211; G01N 21/9501; G01N 21/8422; G01N 2021/213; G01N 2021/8416; H01L 22/12; G01B 11/0616
USPC .......... 356/237.1–237.5, 630–632, 625, 369; 702/155
See application file for complete search history.

(56) References Cited

U.S. PATENT DOCUMENTS

| 11,156,548 B2 * | 10/2021 | Nguyen | G01B 11/0625 |
| 2003/0210408 A1 * | 11/2003 | Jun | G01B 11/0616 356/630 |

(Continued)

FOREIGN PATENT DOCUMENTS

| KR | 101261495 B1 | 5/2013 |
| KR | 101360540 B1 | 2/2014 |
| KR | 1020150018535 A | 2/2015 |

(Continued)

OTHER PUBLICATIONS

Ka-Hyun Kim, "Spectroscopic Ellipsometry Measurement and Modeling of Hydrogenated Amorphous Silicon" Journal of the Korean Solar Energy Society vol. 39, No. 1, pp. 11-19, Feb. 2019.

*Primary Examiner* — Hoa Q Pham
(74) *Attorney, Agent, or Firm* — NKL LAW; Jae Youn Kim

(57) ABSTRACT

A method for measuring a characteristic of a thin film is disclosed. The method includes a) obtaining a measured spectrum from a target region on the substrate by using a spectroscopic ellipsometer, b) obtaining a physical model capable of obtaining an estimated parameter value related to the characteristic of the thin film through regression analysis of the measured spectrum, c) obtaining a machine learning model capable of obtaining a reference parameter value related to the characteristic of the thin film by using the measured spectrum, and d) obtaining an integrated model which uses an integrated error function capable of considering both of a first error function and a second error function, and obtaining an optimum parameter value through regression analysis of the integrated model.

6 Claims, 2 Drawing Sheets

(56) References Cited

U.S. PATENT DOCUMENTS

2007/0019205 A1* 1/2007 Namkoong ........ G01N 21/8422
  356/503
2016/0061583 A1* 3/2016 Ryu .................. G01B 11/0633
  356/630

FOREIGN PATENT DOCUMENTS

| KR | 1020170031819 A | 3/2017 |
| KR | 1020190128262 A | 11/2019 |
| KR | 1020200072302 A | 6/2020 |
| KR | 1020220008384 A | 1/2022 |

* cited by examiner

METHOD FOR MEASURING CHARACTERISTIC OF THIN FILM

TECHNICAL FIELD

Exemplary embodiments of the present disclosure relate to a method for measuring a characteristic of a thin film. More particularly, the exemplary embodiments relate to a method for measuring a characteristic of a thin film, such as thickness of the thin film, optical properties, etc., from a spectrum measured by a spectroscopic ellipsometer, etc., by using machine learning and a physical model.

BACKGROUND

Spectroscopic ellipsometry (SE) is used as a method for deriving optical property information such as thickness of a thin film, such as a semiconductor, dielectric, metal, etc., refractive index (n), extinction coefficient (k), and optical bandgap. The SE is an analysis method that investigates optical and structural properties of a material by using a property that a polarized state changes according to the refractive index or the thickness of a medium after light incident on the material is reflected or transmitted through a surface.

The SE is useful for analyzing the thin film thickness of a thin film structure and the optical properties of the material thereof. However, unlike X-ray diffraction analysis or Raman analysis, which provide direct information on physical properties, measurement of the SE provides only indirect information such as phase differences (Δ) that P and S waves have after reflection and a magnitude ratio (tan Ψ) of the reflection coefficients of the P and S waves. Therefore, in order to obtain thickness information of thin film layers and information on physical properties of layer materials from a measured spectrum, multilayer thin film modeling using a structural model of the layers and information on optical properties of each of the layers is required.

In order to obtain the information on the optical properties, a dispersion model such as Tauc-Lorentz is used. In general, the SE utilizes a structure and physical property parameters obtained by minimizing an error function such as mean square error (MSE) of the measured spectrum and a model value as a result.

However, since the reliability of analysis can vary greatly depending on a method of the modeling, a method for improving the reliability is constantly being studied. Specifically, as 'key performance indicators' that evaluate the reliability in ultra-precision processes such as semiconductor processes, in addition to error factors, speed of measurement and analysis is evaluated as very important along with value accuracy, precision, tool-to-tool matching, in-wafer trends, etc. Among the indicators, precision is a very important factor in the nature of a process, and precision is evaluated by a standard deviation or a related value in repeatedly measuring the same location on the same substrate. The precision of measured values can be affected by various factors, such as:

1. Constancy of spectrum measuring device
2. Spectrum analysis and method
3. Sensitivity to spectral change of measurement parameters
4. Correlation to spectral change between measurement parameters.

First, influence of constancy of a device on determination of parameter values obtained through measurement and analysis is as follows.

For example, even when a target at the same position is measured with the same device, a position, a direction, and physical properties of a stage, a motor, a polarizer, a mirror, a lens, etc. are affected by internal and external environmental factors such as vibration, temperature, and humidity. Furthermore, depending on internal and external electrical and optical state changes of a light source and a spectrometer, a measured spectrum cannot always be consistently obtained. Analysis should be performed taking such noise into account.

Otherwise, when the measured substrate is removed from the substrate chuck and then is mounted thereto again to be measured, position correction is performed through pattern recognition in the substrate, but there is a limit in an error in numerical correction and hardware precision and repeatability of a motor and a stage. Therefore, a position and an azimuth of a measured target does not match perfectly every time.

Second, the effect in which the spectrum analysis method affects a measured value will be described as follows.

A discoverable range of nonlinear regression analysis used in a modeling method is around initial values of parameters, basically. Therefore, with only the basic regression fitting method, when change in spectrum is very large or small depending on corresponding parameter, and when correlation between other parameters to be fitted is high, and when calibration (calibration for a non-identical measuring condition (changing effect depending on characteristic of optical measuring instrument or structural characteristic of target sample) is required, it is difficult to find the global minimum of an optimum mean square error having high reliability which stably secures precision and accuracy for target parameter in a parameter space. Therefore, improvement in accuracy and precision of parameter determination can be considered by adjusting spectral range, the weighted value, parameter fixing or coupling, etc.

A third factor is spectral sensitivity of measurement parameter will be described. In the thin film structure, the sensitivity of the thickness of a thin film to be measured may be very low.

For example, as a thin film having about 10 nm thickness which is formed on a very thick thin film having 1000 nm thickness, it is difficult to precisely and stably analyze the thickness or change of thickness of a thin film consisting of a material that is similar to or lower than the thick thin film in the size of optical reaction such as light reflection.

A fourth factor is correlation between measurement parameters, and for example, in a structure in which very thin SiO2 and Si3N4 materials with a thickness of several nanometers are layered, it is difficult to divide the thicknesses thereof from each other. Because of this, as optical reaction characteristics of the two materials are very similar to each other depending on wavelength of light, very fine differences in which layer thickness changes and affects the spectrum appear.

Specifically, the third and fourth factors, i.e., sensitivity and correlation of a parameter are caused from an optical characteristic of a material or a physical characteristic of the thin film structure, and the effect may be reduced by controlling the measuring device and conditions of an analysis method. On the aspect of the measuring device, in order to increase sensitivity and reduce correlation of measurement parameters, various measuring conditions (wavelength range of light, angle of incidence, or type of data) may be optimized.

In addition, the precision, accuracy, and correlation of measurement parameter values can be improved by improving the analysis method. For example, in the case of thin film structures composed of very thick thin films in which a large number of local minimum values exist, 'a combination of grid search and nonlinear fitting' is used to find approximate optimal values by directly changing unknown parameter values at relatively large intervals. A method of convergence to global minimum values is used. However, in order to use the method by optimizing the number of grids, experts with considerable skill are required, and as the number of unknown parameters increases, the number of grids increases exponentially, and the analysis time also increases proportionally.

On the other hand, when the thickness is very thin or the optical response is very small compared to other constituting thin films, the change in the spectrum according to the change in the thickness parameter is very small, or when the change or size of the spectrum between different parameters is similar, and the mean square error cannot distinguish which parameter is affected, the error range of the parameter values obtained by the regression analysis also increases. In order to correct this problem, a method of selectively fixing the parameter values in the model entering the regression analysis, or forcibly coupling the parameters to each other with offsets or ratios, the number of parameters actually entered into the regression analysis is reduced, and increasing the precision of the target parameter. However, when fixing or binding certain parameters, a very high skill level and a long time are required for modeling in order to apply the correlation between the parameters to the model and perform their optimization. Therefore, it is very difficult to obtain and maintain a high level of accuracy and precision in a process of an integrated device such as a semiconductor.

DOCUMENTS OF RELATED ART

Patent Document

Korean Patent No. 10-1360540
Korean Patent No. 10-1261495

Non Patent Document

Ka-Hyun Kim, "Spectroscopic Ellipsometry Measurement and Modeling of Hydrogenated Amorphous Silicon" Journal of the Korean Solar Energy Society Vol. 39, No. 1, pp. 11-19, February 2019

SUMMARY

Exemplary embodiments of the present disclosure have been made to improve the problems occurring in the related art as described above, and the embodiments are intended to propose a new method for measuring a characteristic of a thin film in order to alleviate difficulties due to sensitivity and correlation of measured values required in the conventional method and need for high proficiency and long optimization time, the method being capable of obtaining high speed and high precision by grafting machine learning to the existing modeling method.

Another objective of the exemplary embodiments is to provide a new method that is improved in the precision of thin film characteristic measurement and optimization speed by utilizing values of physical properties such as thin film thickness obtained by a machine learning model to a multilayer thin film modeling.

In order to achieve the objectives described above, there is provided a method for measuring a characteristic of a thin film formed on a substrate, the method including: a) obtaining a measured spectrum from a target region on the substrate by using a spectroscopic ellipsometer, b) obtaining a physical model capable of obtaining an estimated parameter value related to the characteristic of the thin film through regression analysis of the measured spectrum, c) obtaining a machine learning model capable of obtaining a reference parameter value related to the characteristic of the thin film by using the measured spectrum, and d) obtaining an integrated model which may use an integrated error function capable of considering both of a first error function between the measured spectrum and a calculated spectrum by the physical model and a second error function between the estimated parameter value input into the physical model in order to obtain the calculated spectrum and the reference parameter value, and obtaining an optimum parameter value through regression analysis of the integrated model.

According to an exemplary embodiment, a reason for using the machine learning model and the physical model simultaneously as described above is as follows.

First, the physical model may use a physically meaningful value for calculation, derive a physically reasonable value through analysis, and present a parameter value physically related to change on a process, so that the parameter value does not deviate significantly from a process standard indicator stably even during change of the process.

However, when correlation between parameters constituting the physical model is high or sensitivity to spectrum is low, accuracy or precision may be adversely affected. Furthermore, when an optical measurement device is not optically ideal, it may be difficult to perform calibration, and a lot of experience and time may be required to perform optimization to obtain a value close to the desired value.

Second, even without a complex physical model and optimization, the machine learning model may obtain a parameter value with respect to arbitrary spectral input through learning when values of spectrum and parameter (label values) are provided.

However, these values may be more statistical than physical. Therefore, when there is a change in the combination of parameters or a change on a thin film process, the change being not included in the existing training data, the changes may not be detected, so that the machine learning model does not detect the change, and it is very likely to cause errors.

Therefore, the exemplary embodiments may combine the physical model and the machine learning model with each other in a complementary method, so that advantage of each model can be maintained as much as possible and disadvantage thereof can be compensated with each other, which is the advantage.

Furthermore, there may be provided the method for measuring a characteristic of a thin film, wherein the first error function may be expressed with equation 1 below.

$$f_1 = \frac{W_1}{N-M} \sum_{n=1}^{N} \left[ \frac{(S_{E,n} - S_{P,n})^2}{\sigma_{E,n}^2} \right] \qquad \text{[Equation 1]}$$

Here, N indicates the number of wavelength points of the measured spectrum ($S_E$), M indicates the number of variables of the measured spectrum ($S_E$), $W_1$ indicates a weighted value of the first error function ($f_1$), and $\sigma_E$ indicates a standard deviation of values of the measured spectrum ($S_E$) at a corresponding wavelength point.

Furthermore, the obtaining of the machine learning model at (c) may be performed by obtaining the machine learning model through machine training using both of the measured spectrum and the spectrum generated using the physical model.

Furthermore, there may be provided the method for measuring a characteristic of a thin film, wherein the second error function may be expressed with equation 2 below.

$$f_2 = W_2 \sum_{m=1}^{M} \left[ \frac{(P_{ML,m} - P_{P,m})^2}{\sigma_{P,m}^2} \right]$$ [Equation 2]

Here M indicates the number of variables, $W_2$ indicates a weighted value of the second error function, and $\sigma_P$ indicates a standard deviation of values of the estimated parameter value ($P_P$).

Furthermore, there may be provided the method for measuring a characteristic of a thin film, wherein the integrated error function is expressed with equation 3 below.

$$f = f_1 + f_2 = \frac{W_1}{N-M} \sum_{n=1}^{N} \left[ \frac{(S_{E,n} - S_{P,n})^2}{\sigma_{E,n}^2} \right] + W_2 \sum_{m=1}^{M} \left[ \frac{(P_{ML,m} - P_{P,m})^2}{\sigma_{P,m}^2} \right]$$ [Equation 3]

Here N indicates the number of wavelength points of the measured spectrum ($S_E$), M indicates the number of variables, $W_1$ indicates a weighted value of the first error function, $\sigma_E$ indicates a standard deviation of values of the measured spectra ($S_E$) at a corresponding wavelength point.

Furthermore, $W_2$ indicates a weighted value of the second error function ($f_2$), and $\sigma_P$ indicates a standard deviation of values of the estimated parameter value ($P_P$).

Furthermore, there may be provided the method for measuring a characteristic of a thin film, wherein in the obtaining of the integrated model at (d), by using equation 4 below which may be obtained by partial differentiating the integrated error function by the estimated parameter value, adjustment of a size or direction of the estimated parameter value may be performed during a process of the regression analysis.

$$\frac{\partial f}{\partial P_{P,m}} = \frac{W_1}{N-M} \sum_{n=1}^{N} \left[ \frac{(S_{E,n} - S_{P,n})}{\sigma_{E,n}^2} \left( \frac{\partial S_{P,n}}{\partial P_{P,m}} \right) \right] + 2W_2 \frac{(P_{ML,m} - P_{P,m})}{\sigma_{P,m}^2}$$ [Equation 4]

Here, N indicates the number of wavelength points of the measured spectrum ($S_E$), M indicates the number of variables, $W_1$ indicates a weighted value of the first error function ($f_1$), $\sigma_E$ indicates a standard deviation of values of the measured spectrum ($S_E$) at a corresponding wavelength point.

Furthermore, $W_2$ indicates a weighted value of the second error function ($f_2$), and $\sigma_P$ indicates a standard deviation of values of the estimated parameter value ($P_P$).

According to exemplary embodiments of the present disclosure, the method for measuring a characteristic of a thin film is configured to combine the physical model and the machine learning model with each other in a complementary method, so that the exemplary embodiments have the advantage of high speed and high precision.

DETAILED DESCRIPTION

Figure 1:
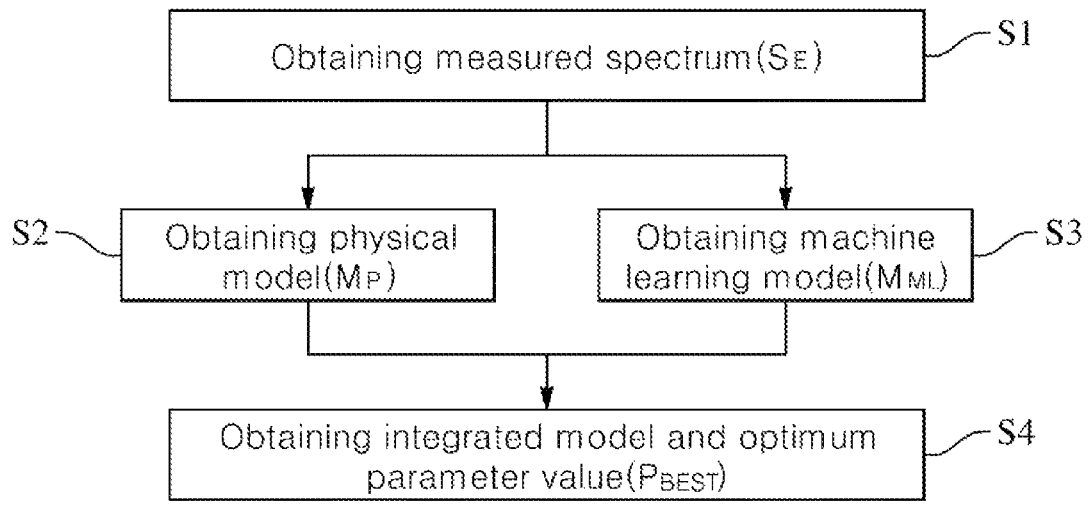
FIG. 1 is a flow chart of a method for measuring a characteristic of a thin film according to an embodiment of the present disclosure.

Hereinbelow, exemplary embodiments of the present disclosure will be described with reference to accompanying drawings. However, various changes to the embodiments of the present disclosure are possible and the scope of the present disclosure is not limited to the following embodiments. The embodiments of the present disclosure are presented to make complete understanding of the present disclosure and help a person of ordinary skill in the art best understand the present disclosure. Therefore, it should be understood that the shape and size of the elements shown in the drawings may be exaggeratedly drawn to provide an easily understood description, and the same reference numerals will be used throughout the drawings and the description to refer to the same or like elements or parts.

FIG. 1 is a flow chart of a method for measuring a characteristic of a thin film according to an embodiment of the present disclosure. According to an exemplary embodiment, the characteristic of a thin film includes not only the thickness of the thin film, but also arbitrary parameters input into the physical model such as a refractive index (n), an extinction coefficient (k), etc. The method for measuring a characteristic of a thin film of the exemplary embodiment may be used to measure at least one parameter of the above-mentioned parameters.

As shown in FIG. 1, according to the embodiment of the present disclosure, the method for measuring a characteristic of a thin film starts with obtaining a measured spectrum $S_E$ from a target region on a substrate by using a spectroscopic ellipsometer, at S1.

In this stage, a spectrum is obtained from a single-layered or multi-layered thin film deposited on the substrate by using the spectroscopic ellipsometer. The substrate may be a metal substrate or a semiconductor substrate. The thin film layer may be a layer constituting a semiconductor device or an electronic device such as a display device, a solar cell, etc. The thin film layer may be a semiconductor or a metal layer. The substrate may be in a fixed state to a stage or a table of a deposition chamber forming the thin film.

The spectroscopic ellipsometer is a device radiating polarized light to the target region and then measuring variation of polarization of light returned from the target region. The spectroscopic ellipsometer may include a lighting system and a spectrometer.

The lighting system may emit the polarized light on the target region. The polarization may be linear polarization. The light may be light having a predetermined wavelength band.

The spectrometer may measure a polarized state of a light reflected from the target region after being incident to the target region by the lighting system. The reflected light may be changed in the polarized state while being reflected. For example, the reflected light may have an elliptically polarized state.

The spectroscopic ellipsometer may obtain a spectrum indicating variation of α value and a β value according to photon energy or wavelength, or a spectrum indicating variation of a Ψ value and a Δ value. The α value is a cosine Fourier coefficient according to continuous rotation of a polarizer, an analyzer, or a compensator, and the β value is a sine Fourier coefficient. The Δ value is a phase difference that a P wave and a S wave that are incident to the target region with the same phase obtain after being reflected, and the Ψ value indicates an angle of a reflected coefficient ratio (tan Ψ) of the p wave and the S wave of the reflected light.

The obtained measured spectrum includes information of each thin film of a layer of the substrate, but does not obtain the characteristic of each thin film of each layer from the measured spectrum by direct conversion, and may obtain the characteristic with the regression analysis using modeling.

Next, through the regression analysis, a physical model $M_P$ that may obtain parameter values related to the thin film characteristic such as a film thickness value is obtained, at S2.

As described above, since the measured spectrum provides only indirect information about the thickness and physical property of each thin film, the thickness of each thin film cannot be calculated from the measured spectrum.

In order to calculate the thickness, etc. of the film, the physical model for interpreting the measured spectrum may be obtained. In this stage, a physical model $M_P$ which may obtain an estimated parameter value $P_P$ related to the characteristic of the thin film such as the thickness of the film is obtained through the regression analysis of the measured spectrum $S_E$.

According to an exemplary embodiment, the physical model is mainly referred to as a multi-layered thin film model consisting of the thickness of each thin film of a target sample and an optical constant, but herein, includes 'an error function' referred in comparison of a measured spectrum and a model value. As the optical constant, a value mainly expressed with a refractive index, an extinction coefficient, or a complex dielectric function may be used, and a constant related to a characteristic of an optical system of a measuring equipment may be included in the optical constant. Other constant values or a value by an optical dispersion model may be used as optical constant depending on wavelength, and as the dispersion model, depending on an optical characteristic of a substance, the Lorentz harmonic oscillator model, the Drude free-electron model, the Cauchy model, the Sellmeir model, the Forouhi-Bloomer model, the Tauc-Lorentz model, etc. may be used.

Parameter values in the initial physical model before optimization may be used by referring a basic value existing in a process plan or a value measured through other reference device, and an optical physical property (optical constant) is separately obtained when the substance is not an existing used substance and is a new substance and is used as an initial value. The physical model may be optimized through a process below.

When fitting is performed with respect to unknown parameters including the thickness, the optical constant (complex refractive index), etc. of the thin film included in the physical model $M_P$ by using a nonlinear regression analysis algorithm, the estimated parameter value $P_P$ related to the thin film characteristic such as the thin film thickness by the physical model $M_P$ may be obtained.

The fitting is referred to as the regression analysis process of finding combination of target parameters in which an error function of spectrums $S_E$ by measurement and spectrums by the physical model $M_P$. The parameter value obtained by the fitting is a value of the estimated parameter value $P_P$ by the physical model $M_P$. In general, as described above, the estimated parameter value $P_P$ obtained through the process of minimizing the error function of the measured spectrums and the spectrums by the physical model $M_P$ may be used as a measured value of the spectroscopic ellipsometer.

However, when referring only to the error function, there is a limit to evaluating and optimizing 'key performance indicators' of the model such as accuracy and precision of the model for calculating a state of a super-precision micro process such as semiconductor, display process, etc. or a change of the state.

Therefore, on the actual process, even data repeatability in response to measuring space and temporal variation and matching with reference data are required, and to this end, sensitivity or the effect in correlation of parameters to be analyzed need to be considered together. A process of testing and evaluating about whether or not 'the key performance indicators' are satisfied is equally required in estimation of each model of S2, S3, and S4.

As described in the prior part of [Background art], a model considering effects of 'constancy of spectrum measuring device', 'sensitivity to spectrum of measurement parameter', 'correlation to spectral change between measurement parameters' should be designed and optimization of the model should be performed.

When improvement of sensitivity and correlation of a parameter is difficult through improvement in the measured spectrum, in the analysis method, relationship between parameters and error functions should be variously redefined to optimize the model. For the optimization, determination based on a lot of experience in the relevant application field is required, and the time required for optimization is very long.

According to an embodiment, although complex relationships between a plurality of parameters can be determined empirically as analytical numerical relationships or conclusively obtained, accuracy and reproducibility are very low, and a lot of trial and error is required for optimization.

Therefore, in exemplary embodiments, a machine learning method is adopted as described below so as to overcome the problem and the limitation described above. To this end, in the next stage, a machine learning model $M_{ML}$ which can obtain a reference parameter value $P_{ML}$ by using an arbitrary measured spectrum $S_E$ is obtained, at S3.

Figure 2:
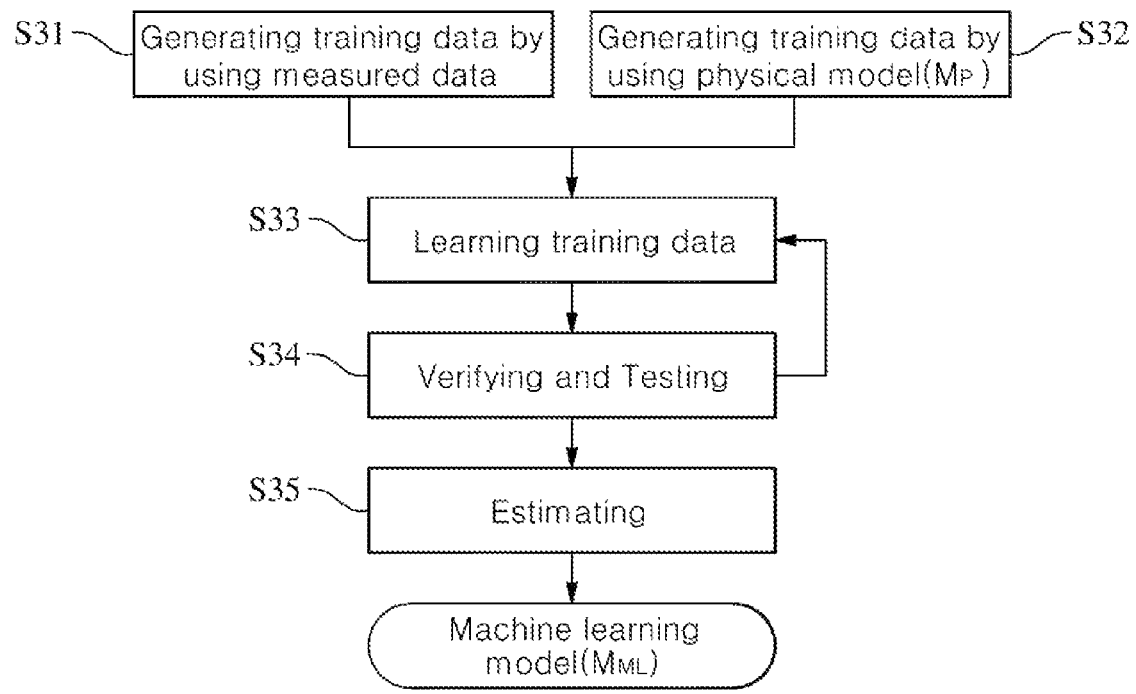
FIG. 2 is a flow chart of obtaining a machine learning model in FIG. 1.

FIG. 2 is a flow chart of obtaining a machine learning model in FIG. 1. As shown in FIG. 2, the obtaining of the machine learning model includes generating training data for machine learning by performing labeling with a plurality of measured spectrums $S_E$ and actual parameter values corresponding to the spectrums, at S31, and leaning the training data, at S33, verifying and testing at S34, evaluating whether or not 'the key performance indicators' are satisfied, at S35.

The actual parameter values may be values measured by other measuring devices, for example, a transmission electron microscopy, a cross-sectional transmission electron microscopy, a spectroscopic reflectometry, an imaging reflectometry, or a measuring device that is standard referenced in the existing process.

Furthermore, exemplary embodiments may include generating training data by using the physical model, at S32.

When the data of the actual parameter values is not sufficient, when necessary, additionally, the estimated parameter value $P_P$, such as the thickness, corresponding to the calculated spectrum $S_P$ from the physical model $M_P$ obtained in S1 may be used as the training data for the machine learning.

When the arbitrary measured spectrum $S_E$ is input into the machine learning model $M_{ML}$ generated in this stage, the reference parameter value $P_{ML}$ by the machine learning model $M_{ML}$ may be obtained. The reference parameter value $P_{ML}$ is a significant value having statistically high accuracy and repeatability, and is a value expected as a value close to an optimum parameter value $P_{BEST}$ making an error function of the measured spectrum $S_E$ and the physical model $M_P$ into a global minimum value. Therefore, the reference parameter value $P_{ML}$ is low in sensitivity of a spectrum and high in correlation with other parameters. Therefore, when the thin film thickness is very high uncertainty or a range of a parameter is wider than the degree of change of a spectrum, the reference parameter value $P_{ML}$ may be used to improve the problem in which during fitting of the parameter, a parameter value does not find a global minimum and approaches a local minimum value.

Hereinbelow, a stage of obtaining an integrated model, i.e. a new physical model with a method of combining the machine learning model to the physical model, and obtaining the optimum parameter value $P_{BEST}$ from the integrated model, at S4, will be described.

Figure 3:
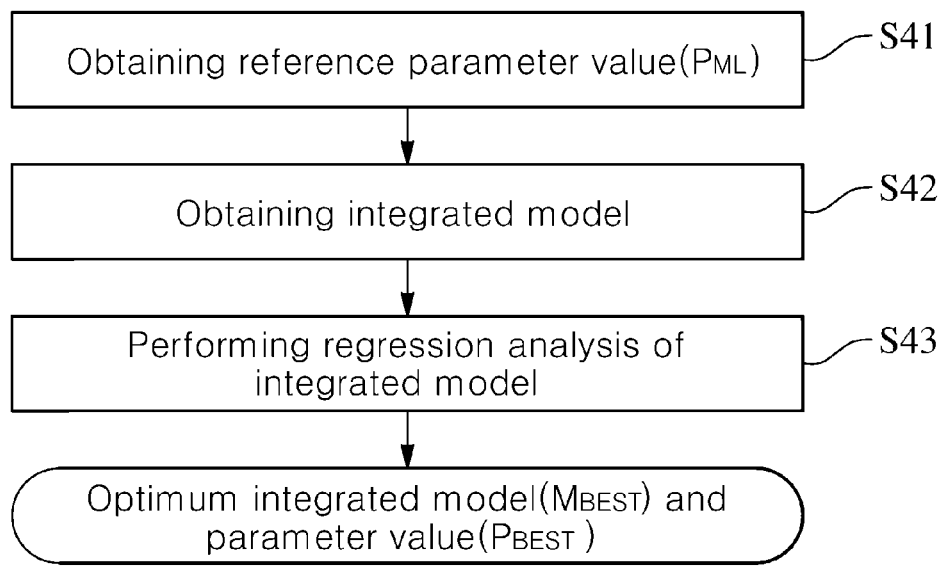
FIG. 3 is a flow chart of obtaining an integrated model and an optimum parameter value in FIG. 1.

FIG. 3 is a flow chart of obtaining the integrated model and the optimum parameter value in FIG. 1, at S4. As shown in FIG. 3, this stage includes obtaining of the reference parameter value $P_{ML}$ by the machine learning model at S4, obtaining of the integrated model at S42, and performing of a regression analysis by the integrated model at S43. When passing through this stage, an optimized integrated model $M_{BEST}$ and the optimum parameter value $P_{BEST}$ can be obtained.

Furthermore, when the optimized integrated model $M_{BEST}$ is obtained, the regression analysis of the optimized integrated model $M_{BEST}$ is performed with the arbitrary measured spectrum $S_E$ so as to directly obtain the optimum parameter value $P_{BEST}$.

In the obtaining of the reference parameter value $P_{ML}$ at S41, the measured spectrum is input into the machine learning model to obtain the reference parameter value $P_{ML}$.

In the obtaining of the integrated model at S42, the machine learning model $M_{ML}$ obtained from the process in FIG. 2 is combined to the physical model $M_P$ obtained from the process in FIG. 1. In other words, in a method of referring to the reference parameter value $P_{ML}$ (film thickness, film optical constant (complex refractive index), incident angle, wavelength, etc.) obtained by inputting the measured spectrum data $S_E$ into the machine learning model $M_{ML}$, the machine learning model $M_{ML}$ obtained through the process in FIG. 2 is combined to the existing physical model $M_P$ generate in FIG. 1.

According to an exemplary embodiment, a model algorithm is configured to refer to the reference parameter value $P_{ML}$ by applying the reference parameter value $P_{ML}$ to a section such as the fitting algorithm or mean square error, as described above.

Furthermore, in the performing of the regression analysis of the integrated model at S43, a parameter value is obtained from the measured spectrum $S_E$ through the regression analysis of the integrated model, and the optimized integrated model $M_{BEST}$ finally desired may be obtained by evaluating and optimized the mean square error and the parameter value on the basis of 'the key performance indicators' of the model. After then, the optimized integrated model $M_{BEST}$ is used in the thin film characteristic analysis to obtain the optimum parameter value $P_{BEST}$.

In order to perform optimization for the model to satisfy 'the key performance indicators', various parameters of the model need to be adjusted. For example, a wavelength range of spectrum and a weighted value for each range, types and number of parameters for which a value is to be found, etc. are appropriately selected. The optimization of the parameters should be performed in the direction that satisfies 'the key performance indicators' through 'the regression analysis' in common. According to an exemplary embodiment, a part that tries to apply a value of machine learning of the parameters to the model is an algorithmic formula part of 'the regression analysis', and the part allows determination of parameters with optimized high precision.

To this end, the stage uses the error function (equation 3) obtained by adding the error function (equation 2) with reference to the estimated parameter value $P_P$ used in spectral calculation using the physical model $M_P$ and the reference parameter values $P_{ML}$ obtained through the machine learning model $M_{ML}$ to the basic error function (equation 1) related to a difference between the measured spectrum $S_E$ in the regression analysis and the spectrum $S_P$ obtained by using the physical model $M_P$.

Like equation 4, when the degree of change of error function according to change of parameter values in the regression analysis algorithm such as Levenberg-Marquardt is calculated, a method of using the reference parameter value $P_{ML}$ derived from the machine learning model $M_{ML}$ will be proposed. According to an exemplary embodiment, the reference parameter values are values given through the machine learning model $M_{ML}$.

However, in order to perform optimization of the model by using statistical advantage of machine learning sufficiently, for example, the estimated parameter values $P_P$ such as thin film thickness are obtained by performing the fitting in a direction that minimizes sum of differences so as to minimize a difference between the reference parameter value $P_{ML}$ obtained through the machine learning model $M_{ML}$ and the estimated parameter value $P_P$ input into the physical model $M_P$. On the other hand, the size or direction of change in a parameter inside the regression analysis algorithm such as Lavenberg-Marquardt may be controlled within a weighted value or a range with reference to the reference parameter value $P_{ML}$.

The integrated error function used herein consists of mainly two sections, as follows. the integrated error function (f)=① the first error function ($f_1$)+② the second error function ($f_2$)

The first error function relates to a difference of spectrum $S_P$ theoretically calculated by using the measured spectrum $S_E$ measured by a device and the physical model $M_P$, and various error functions, such as mean squared error (MSE), root mean squared error, mean absolute error, mean absolute percentage error, mean percentage error, etc., may be used as evaluation indicators of the physical model.

For example, the MSE value of Equation 1 below may be used as the first error function. Smallness of the first error function means smallness of difference of spectrums $S_P$ obtained using the measured spectrum $S_E$ and the physical model $M_P$ (high agreement).

$$f_1 = \frac{W_1}{N-M} \sum_{n=1}^{N} \left[ \frac{(S_{E,n} - S_{P,n})^2}{\sigma_{E,n}^2} \right] \quad \text{[Equation 1]}$$

Here N indicates the number of wavelength points of the measured spectrum ($S_E$), M indicates the number of variables of the measured spectrum ($S_E$), $W_1$ indicates a weighted value of the first error function ($f_1$), and $\sigma_E$ indicates a standard deviation of values of the measured spectrum ($S_E$) at a corresponding wavelength point, and act as weighted values for each wavelength. According to an exemplary embodiment, when the weighted value $W_1$ is used in a shape adding with the second error function, the weighted value $W_1$ of the first error function may be used as a weighted value.

The second error function in Equation 2 is a parameter error function related to a difference between the reference parameter value $P_{ML}$ and the estimated parameter value $P_P$ used in the physical model $M_P$.

$$f_2 = W_2 \sum_{m=1}^{M}\left[\frac{(P_{ML,m} - P_{P,m})^2}{\sigma_{P,m}^2}\right] \quad \text{[Equation 2]}$$

Here, $W_2$ is used to assign a relative weighted value with respect to the second error function, as a weighted value of the parameter error function. $\sigma_P$ indicates a standard deviation of the estimated parameter value $P_P$. According to an exemplary embodiment, the reference parameter value $P_{ML}$ uses the estimated parameter value $P_P$ given through the machine learning model $M_{ML}$. In some case, arbitrarily given value may be used.

Smallness of the second error function means smallness of a difference between the estimated parameter value $P_P$ used in the process of obtaining the theoretical spectrum $S_P$ and the reference parameter value $P_{ML}$ obtained through the machine learning model $M_{ML}$ (high agreement).

Equation 3 descried below is the sum of the first error function and the second error function, and the sum is the integrated error function that considers differences between the estimated parameter value $P_P$ and the reference parameter value $P_{ML}$ for not only spectrum, but also parameters at the same time. Here, $W_1$ and $W_2$ are relative weighted values, and as the sum of $W_1$ and $W_2$ is set as 1, relative weighted values may be assigned.

$$f = f_1 + f_2 = \frac{W_1}{N-M}\sum_{n=1}^{N}\left[\frac{(S_{E,n}-S_{P,n})^2}{\sigma_{E,n}^2}\right] + W_2\sum_{m=1}^{M}\left[\frac{(P_{ML,m}-P_{P,m})^2}{\sigma_{P,m}^2}\right] \quad \text{[Equation 3]}$$

Equation 4 may be used, as partial differentiation of the integrated error function (f) for any parameter, when the size or direction of change of the estimated parameter values $P_P$ inside the regression analysis algorithm is determined.

$$\frac{\partial f}{\partial P_{P,m}} = \frac{W_1}{N-M}\sum_{n=1}^{N}\left[\frac{(S_{E,n}-S_{P,n})}{\sigma_{E,n}^2}\left(\frac{\partial s_{P,n}}{\partial P_{P,m}}\right)\right] + 2W_2\frac{(P_{ML,m}-P_{P,m})}{\sigma_{P,m}^2} \quad \text{[Equation 4]}$$

In this stage, through the fitting process of changing the estimated parameter values $P_P$ are changed and finding the optimized value (mostly, minimized value) of the integrated error function, the optimum parameter value $P_{BEST}$ is obtained.

Although the embodiment of the present disclosure has been disclosed for illustrative purposes, and the present disclosure is not limited to the embodiment disclosed in the detailed description, those skilled in the art will appreciate that various modifications, additions and substitutions are possible, without departing from the scope and spirit of the invention as disclosed in the accompanying claims, and also various alternatives, modifications, equivalents and other embodiments that may be included within the spirit and scope of the present disclosure.

The invention claimed is:

1. A method for measuring a characteristic of a thin film formed on a substrate, the method comprising:
  a) obtaining a measured spectrum ($S_E$) from a target region on the substrate by using a spectroscopic ellipsometer,
  b) obtaining a physical model ($M_P$) capable of obtaining an estimated parameter value ($P_P$) related to the characteristic of the thin film through a regression analysis of the measured spectrum ($S_E$),
  c) obtaining a machine learning model ($M_{ML}$) capable of obtaining a reference parameter value ($P_{ML}$) related to the characteristic of the thin film by using the measured spectrum ($S_E$), and
  d) obtaining an integrated model which uses an integrated error function (f) capable of considering both of a first error function ($f_1$) between the measured spectrum ($S_E$) and a calculated spectrum ($S_P$) by the physical model ($M_P$) and a second error function ($f_2$) between the estimated parameter value ($P_P$) input into the physical model ($M_P$) in order to obtain the calculated spectrum ($S_P$) and the reference parameter value ($P_{ML}$), and obtaining an optimum parameter value ($P_{BEST}$) through a regression analysis of the integrated model.

2. The method of claim 1, wherein the first error function ($f_1$) is expressed with equation 1 below:

$$f_1 = \frac{W_1}{N-M}\sum_{n=1}^{N}\left[\frac{(S_{E,n}-S_{P,n})^2}{\sigma_{E,n}^2}\right], \quad \text{[Equation 1]}$$

wherein N indicates the number of wavelength points of the measured spectrum ($S_E$), M indicates the number of variables of the measured spectrum ($S_E$), $W_1$ indicates a weighted value of the first error function ($f_1$), and $\sigma_E$ indicates a standard deviation of values of the measured spectrum ($S_E$) at a corresponding wavelength point.

3. The method of claim 1, wherein the obtaining of the machine learning model at (c) is performed by obtaining the machine learning model ($M_{ML}$) through machine training using both of the measured spectrum ($S_E$) and the calculated spectrum ($S_P$) generated using the physical model ($M_P$).

4. The method of claim 1, wherein the second error function ($f_2$) is expressed with equation 2 below:

$$f_2 = W_2\sum_{m=1}^{M}\left[\frac{(P_{ML,m}-P_{P,m})^2}{\sigma_{P,m}^2}\right], \quad \text{[Equation 2]}$$

wherein M indicates the number of variables, $W_2$ indicates a weighted value of the second error function, and $\sigma_P$ indicates a standard deviation of values of the estimated parameter value ($P_P$).

5. The method of claim 1, wherein the integrated error function (f) is expressed with equation 3 below:

[Equation 3]

$$f = f_1 + f_2 = \frac{W_1}{N-M}\sum_{n=1}^{N}\left[\frac{(S_{E,n}-S_{P,n})^2}{\sigma_{E,n}^2}\right] + W_2\sum_{m=1}^{M}\left[\frac{(P_{ML,m}-P_{P,m})^2}{\sigma_{P,m}^2}\right],$$

wherein N indicates the number of wavelength points of the measured spectrum ($S_E$), M indicates the number of variables, $W_1$ indicates a weighted value of the first error function, $\sigma_E$ indicates a standard deviation of values of the measured spectra ($S_E$) at a corresponding wavelength point, $W_2$ indicates a weighted value of the second error function ($f_2$), and $\sigma_P$ indicates a standard deviation of values of the estimated parameter value ($P_P$).

6. The method of claim 1, wherein in the obtaining of the integrated model at (d), by using equation 4 below which is obtained by partial differentiating the integrated error function (f) by the estimated parameter value ($P_P$), a size or direction of the estimated parameter value ($P_P$) is adjusted during a process of the regression analysis, the equation 4 is expressed as:

[Equation 4]

$$\frac{\partial f}{\partial P_{P,m}} = \frac{W_1}{N-M}\sum_{n=1}^{N}\left[\frac{(S_{E,n}-S_{P,n})}{\sigma_{E,n}^2}\left(\frac{\partial S_{P,n}}{\partial P_{P,m}}\right)\right] + 2W_2\frac{(P_{ML,m}-P_{P,m})}{\sigma_{P,m}^2},$$

wherein N indicates the number of wavelength points of the measured spectrum ($S_E$), M indicates the number of variables, $W_1$ indicates a weighted value of the first error function ($f_1$), $\sigma_E$ indicates a standard deviation of values of the measured spectrum ($S_E$) at a corresponding wavelength point, $W_2$ indicates a weighted value of the second error function ($f_2$), and $\sigma_P$ indicates a standard deviation of values of the estimated parameter value ($P_P$).

* * * * *